United States Patent
Wang

(10) Patent No.: US 6,289,920 B1
(45) Date of Patent: Sep. 18, 2001

(54) AIR PUMP NOZZLE CAPABLE OF ADJUSTING AUTOMATICALLY TO FIT INFLATION VALVES OF VARIOUS TYPES

(76) Inventor: Lo-Pin Wang, 16F-2, No. 17, Lane 52, Sec. 3, Re He Rd., Taichung (TW)

( * ) Notice: Subject to any disclaimer, the term of this patent is extended or adjusted under 35 U.S.C. 154(b) by 0 days.

(21) Appl. No.: 09/557,408

(22) Filed: Apr. 24, 2000

(51) Int. Cl.$^7$ .................................................. F16K 15/20
(52) U.S. Cl. ............................ 137/223; 137/231; 251/65
(58) Field of Search ................................. 137/223, 231; 251/65

(56) References Cited

U.S. PATENT DOCUMENTS

| | | | | |
|---|---|---|---|---|
| 4,819,686 | * | 4/1989 | Achterholt | 137/229 |
| 5,379,796 | * | 1/1995 | Wang | 137/231 |
| 5,666,990 | * | 9/1997 | Wu | 137/223 |
| 5,749,392 | * | 5/1998 | Glotin | 137/231 |
| 5,829,492 | * | 11/1998 | Gavronsky et al. | 141/96 |
| 5,902,097 | * | 5/1999 | Wu | 417/440 |
| 5,960,815 | * | 10/1999 | Wang | 137/118.03 |
| 6,076,544 | * | 6/2000 | Pierce | 137/223 |

* cited by examiner

*Primary Examiner*—Michael Powell Buiz
*Assistant Examiner*—Meredith H. Schoenfeld
(74) *Attorney, Agent, or Firm*—Browdy and Neimark, PLLC

(57) ABSTRACT

An air pump nozzle has a receiving compartment with an open end where a handle is pivoted. The receiving compartment is provided at other end thereof with a holding mouth involuting a large diametric end of fish-eye through hole of an elastic holding member which is pressed against by a press member having a receiving hole in which a pushing member and a valve urging member are disposed. In operation, the inflation valve of the U.S. type is received in the through hole of the holding member. The handle is swiveled to force the pushing member to actuate the press member to press the holding member to deform so as to hold securely the inflation valve. The inflation valve is opened up by the valve urging rod which is pushed by the pushing member. The inflation valve of the French type passes the holding member to push the valve urging rod to a stop point. The holding member is deformed to hold securely the inflation valve which is opened up by the valve urging rod which is pushed by the pushing member. As the inflation valve is disengaged, the pushing member and the valve urging rod are forced back to their original positions by an elastic member and a magnetic member.

7 Claims, 4 Drawing Sheets

AIR PUMP NOZZLE CAPABLE OF ADJUSTING AUTOMATICALLY TO FIT INFLATION VALVES OF VARIOUS TYPES

FIELD OF THE INVENTION

The present invention relates generally to an air pump, and more particularly to an air pump nozzle capable of adjusting automatically to fit the inflation valves of various types.

BACKGROUND OF THE INVENTION

The bicycle tire is provided with an inflation valve of the U.S. type or French type. The conventional air pump nozzle is generally not compatible with the inflation valves of both types. However, there are currently certain conventional air pump nozzles which are compatible with the inflation valves of the U.S. type and the French type. The operation of such conventional air pump nozzles involves the switching action which complicates the use of the air pumps.

SUMMARY OF THE INVENTION

The primary objective of the present invention is to provide an air pump with a nozzle capable of adjusting automatically to fit an inflation valve of the U.S. type or French type.

In keeping with the principle of the present invention, the foregoing objective of the present invention is attained by an air pump nozzle comprising a housing, an elastic holding member, a pressing member, a first attracting member, a valve urging rod, a pushing member, an elastic recovery member, and a handle. The housing has a receiving compartment which is provided with an open end and is provided at other end thereof with a holding mouth in communication with the atmospheric air. The receiving compartment is provided in the wall thereof with an air inlet. The elastic holding member is disposed in the receiving compartment such that the elastic holding member is corresponding in location to one end of the holding mouth. The elastic holding member has a large diametrical hole and a small diametrical hole extending from the inner end of the large diametrical hole, The press member is disposed in the receiving compartment of the housing such that the inner end of the press member urges the elastic holding member. The press member is provided with a receiving hole and at least one ventilation hole extending from the outer periphery thereof to communicate with the receiving hole. The receiving hole is provided in the wall thereof with a guide slope. The first attraction member is disposed in the proximity of the inner end of the press member. The valve urging rod is movably disposed in the receiving hole of the press member and is provided with a second attraction member. The pushing member is movably disposed in the receiving hole of the press member and is provided with a receiving space in which the valve urging rod is received. The receiving space is provided in the wall thereof with a plurality of pliable arms capable of bending along the guide slope at such time when the pushing member is located at the innermost end. The valve urging rod is thus confined by the pliable arms. The recovery member is disposed in the receiving hole such that one end of the recovery member urges the press member, and that other end of the recovery member urges the pushing member. The handle is pivoted to the housing to turn from a standby position to an operation position so as to cause the pushing member to displace a distance.

DETAILED DESCRIPTION OF THE INVENTION

Figure 1:
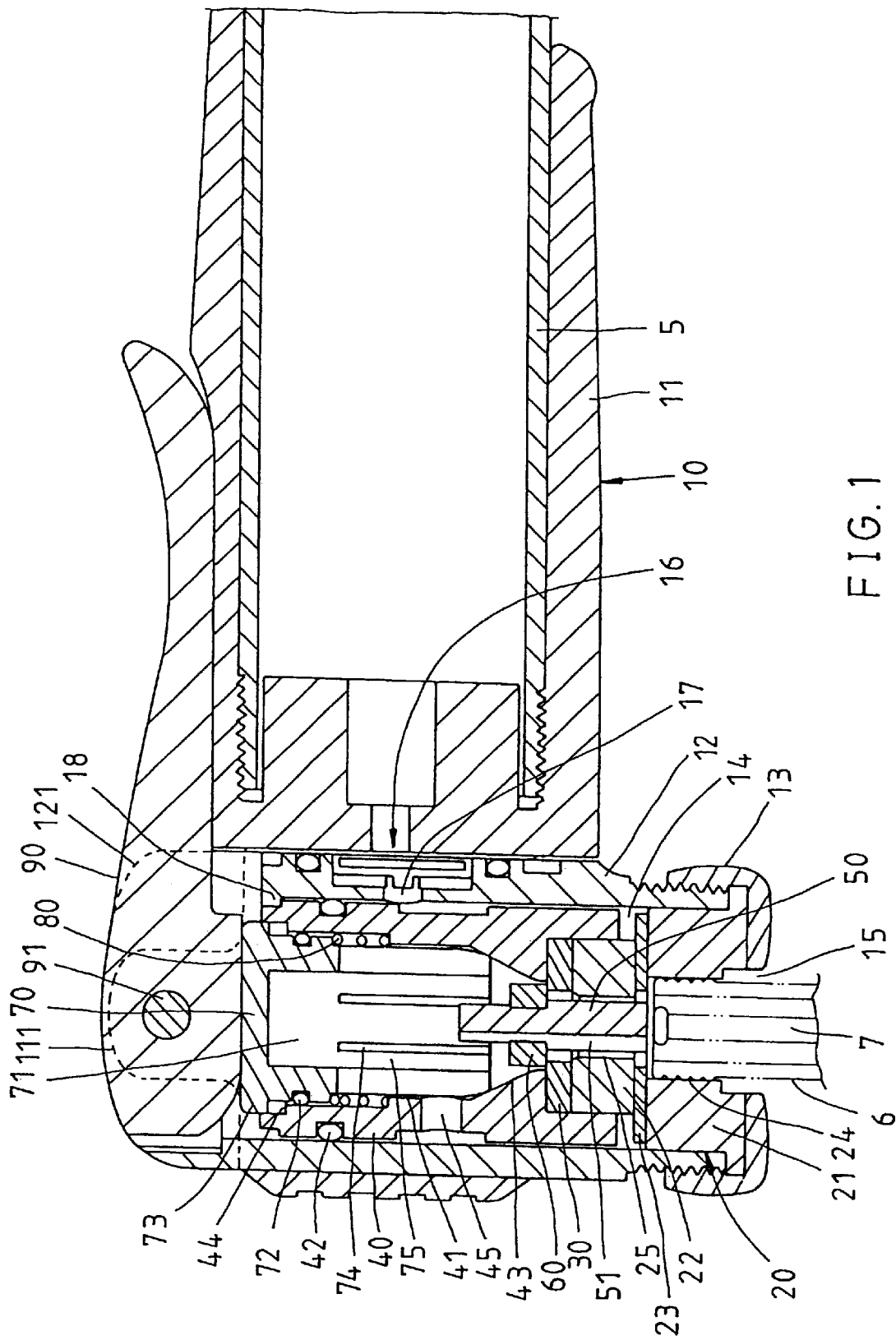
FIGS. 1 and 2 are schematic views of the present invention in conjunction with an inflation valve of the U.S. type.

As shown in FIG. 1, the present invention comprises the component parts which are described hereinafter.

A housing 10 is formed of a tubular body 11, a cylindrical body 12, and an end cover 13. The cylindrical body 12 is provided therein with a cylindrical receiving compartment 14 having an open top. The end cover 13 is provided in the center thereof with a holding mouth 15. The tubular body 11 is fastened with a cylinder tube 5 of an air pump, or a hose which is connected with an inflation device. The inflating air is admitted to the receiving compartment 14 via a check valve 16 and an air inlet 17.

An elastic holding member 20 is disposed in the bottom of the receiving compartment 14 and is formed of a large annular block 21, a small annular block 22, and a rigid annular plate 23 located between the large annular block 21 and the small annular block 22. The blocks 21, 22 and the plate 23 are stacked together to form the holding member 20 of a two-segmented cylindrical construction. The holding member 20 is provided with a large diametric hole 24 and a small diametric hole 25, which are respectively corresponding in diameter to the inflation valve of the U.S. type and the inflation valve of the French type.

A first attraction member 30 is disposed on the top of the holding member 20. The first attraction member 30 is a magnet.

A press member 40 of a cylindrical construction is provided with a receiving hole 41 extending along the direction of a longitudinal axis of the press member 40. The press member 40 is disposed in the receiving compartment 14 such that the press member 40 displaces along the direction of the longitudinal axis, and that the bottom end of the press member 40 urges the holding member 20 and the first attraction member 30, and that the top end of the press member 40 is located at the top end of the receiving compartment 14. The press member 40 is provided with a leakproof ring 42 fitted thereover. The receiving hole 41 is provided in the wall thereof with a guide slope 43 slanting from the wall toward the center of the receiving hole 41, and a annular shoulder 44. The press member 40 has an air hole 45 extending from the periphery thereof to be in communication with the receiving hole 41.

A valve urging rod 50 is movably disposed in the receiving hole 41 of the press member 40 and is provided with an air slit 51 and an annular second attraction member 60 capable of mutual attraction with the first attraction member 30 for retaining securely the valve urging rod 50.

A pushing member 70 of a cylindrical construction is provided with a receiving space 71 and is movably disposed in the receiving hole 41 of the press member 40. The pushing member 70 is provided with a leakproof ring 72 fitted thereover, and an annular protruded edge 73 capable of being retained on the annular shoulder 44. The pushing member 70 is provided in the wall thereof with a plurality of slits 74 and pliable arms 75.

A recovery member 80 is disposed in the receiving hole 41 of the press member 40 such that the recovery member 80 is engaged with the pushing member 70, and that both ends of the recovery member 80 urge respectively the press member 40 and the pushing member 70. The recovery member 80 is a coil spring.

Figure 2:
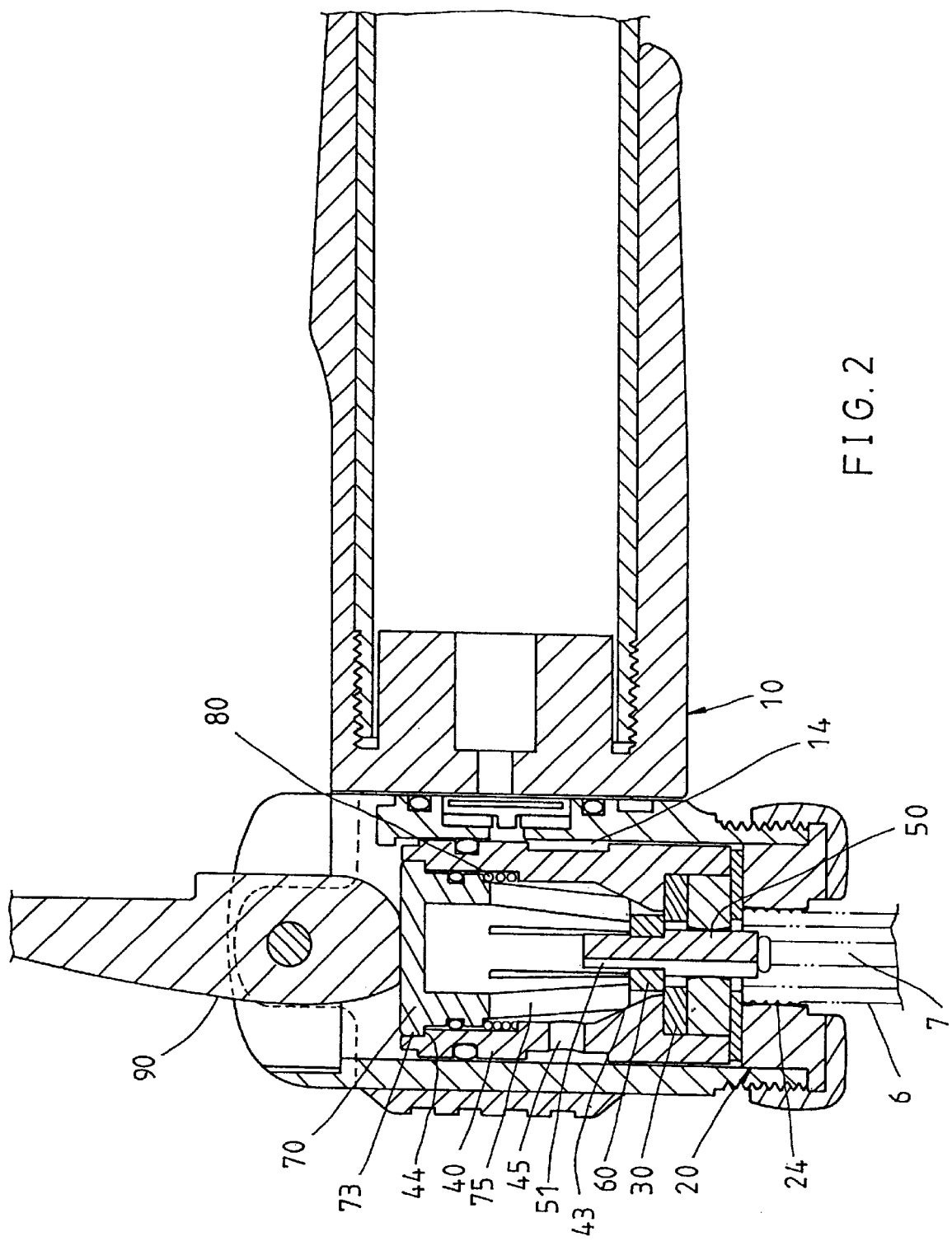

A handle 90 is fastened pivotally at one end thereof with the top of the cylindrical body 12 of the housing 10 by a pivot 91, which is put through the protuberance 111 of the tubular body 11 and the clamp wall 121 of the cylindrical body 12. As shown in FIG. 1, the handle 90 is located at a standby position such that the handle 90 can be swiveled to locate at an operation position, as shown in FIG. 2. The pushing member 70 can be pressed downward while the handle 90 is swiveled from the standby position to the operation position.

As illustrated in FIG. 1, when the air pump of the present invention is in the standby state, the press member 40 is supported by the elastic holding member 20 to remain at the upper stop point such that the top end of the press member 40 is stopped by the retaining block 18 of the recovery member 80, and that the annular shoulder 44 of the press member 40 is kept apart from the annular protruded edge 73 by a distance. The valve urging rod 50 is kept at the position, as shown in FIG. 1, by the first attraction member 30 attracting the second attraction member 60 of the valve urging rod 50.

In operation, the holding mouth 15 is engaged with the inflation valve of an inflatable object. If the inflation valve is of the U.S. type, as shown in FIG. 1, the inflation valve 6 is stopped at the inner end of the large diametric hole 24 of the holding member 20. As the handle 90 is swiveled from the standby position to the operation position, the pushing member 70 is forced to displace downwards such that the annular protruded edge 73 comes in contact with the annular shoulder 44, and that the second attraction member 60 is confined by the pliable arm 75 which bends inwards along the guide slope 43. Subsequently, the press member 40 is actuated by the pushing member 70 to displace downward. The valve urging rod 50 is also actuated by the pushing member 70 to displace downward. As shown in FIG. 2, when the handle 90 is located at the operation position, the elastic holding member 20 is squeezed by the press member 40 such that the large diametric hole 24 is engaged securely with the inflation valve 6, and that the valve bar 7 of the inflation valve 6 is pressed open by the valve urging rod 50, thereby enabling the air of the air pump to enter the inflation valve 6 via the slits 51 of the valve urging rod 50, the receiving hole 41 of the air hole 45 of the press member 40, and the receiving compartment 14. As the handle 90 is swiveled back to the standby position, the press member 40 and the pushing member 70 are respectively forced back to their original positions by the elastic holding member 20 and the recovery member 80.

Figure 3:
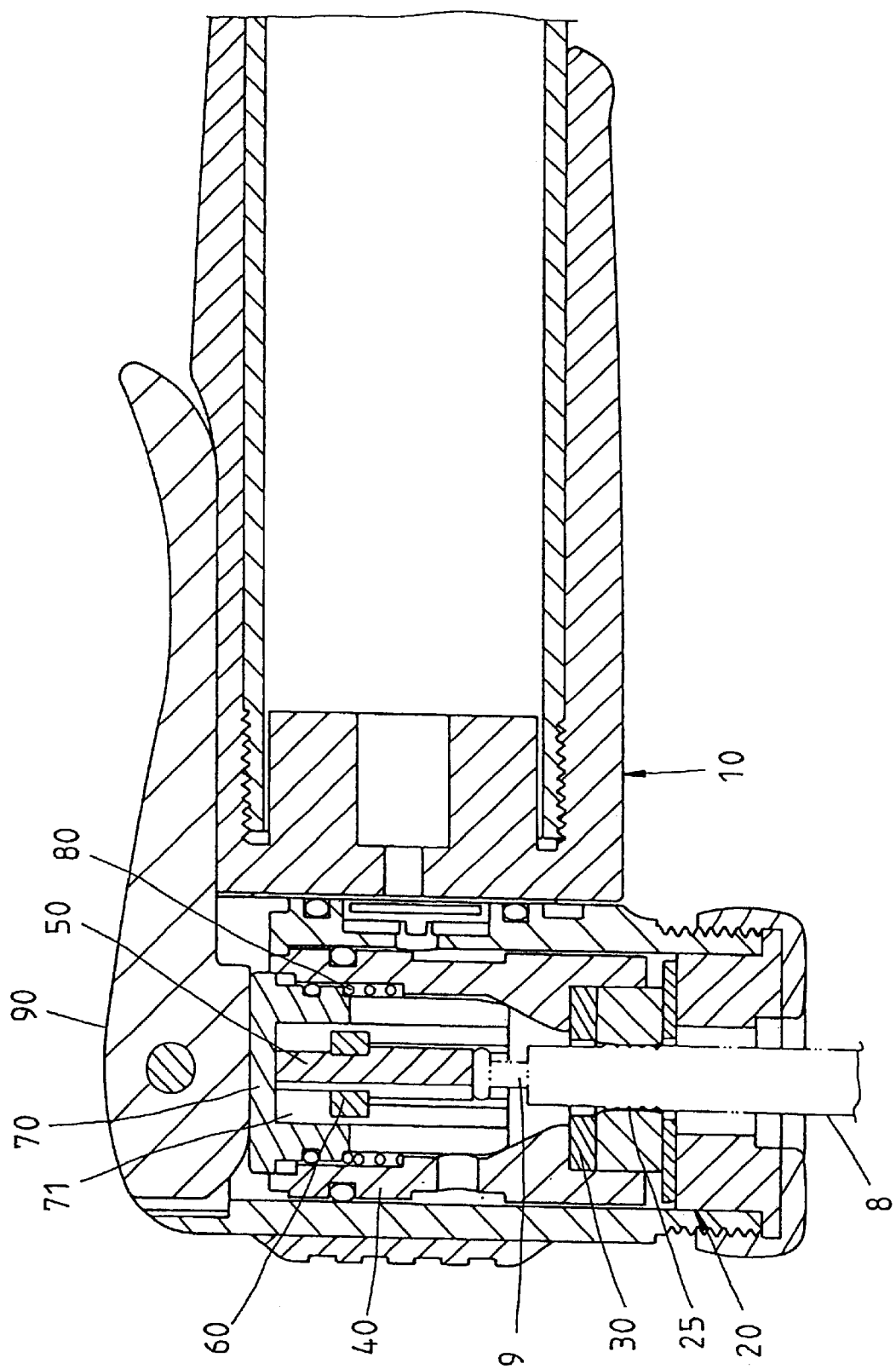
FIGS. 3 and 4 are schematic views of the present invention in conjunction with an inflation valve of the French type.
Figure 4:
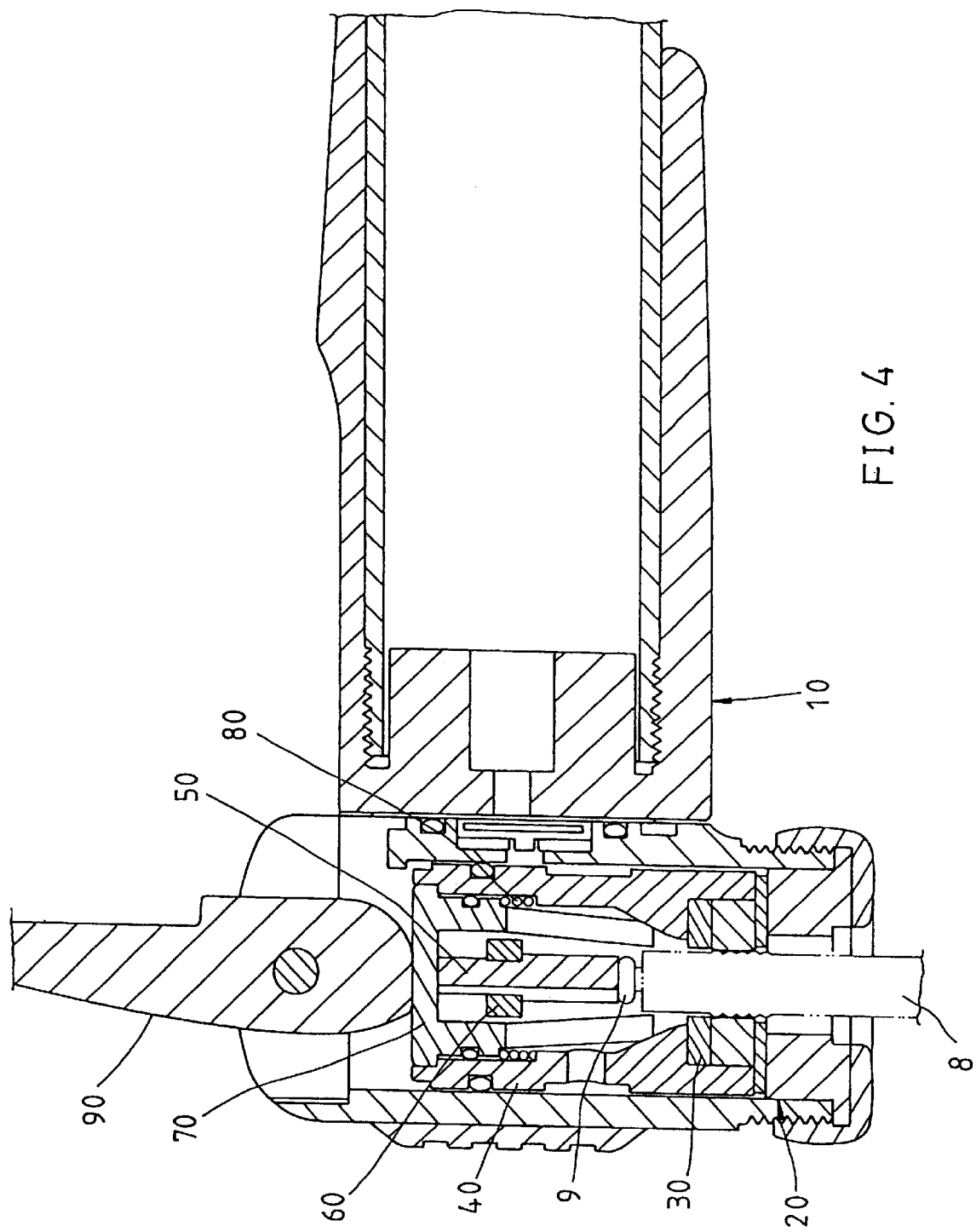

As shown in FIGS. 3 and 4, the inflation valve 8 of the French type is inserted into the small diametric hole 25 of the holding member 20 such that the valve urging rod 50 is forced into the innermost end of the receiving space 71 of the pushing member 70, as shown in FIG. 3. As the handle 90 is swiveled to locate at the operation position, the holding member 20 is deformed such that the small diametric hole 25 holds securely the inflation valve 8 of the French type. As the pushing member 70 displaces downward, the valve urging rod 50 is pressed by the top of the pushing member 70 such that the valve bar 9 of the inflation valve 8 is urged by the valve urging rod 50 to open up the inflation valve 8, as shown in FIG. 4. As the inflation valve 8 is disengaged with the holding member 20, the second attraction member 60 of the valve urging rod 50 and the first attraction member 30 attract each other to enable the valve urging rod 50 to return to its original position.

What is claimed is:

1. An air pump nozzle comprising:

a housing provided with a receiving compartment, said receiving compartment provided with an open end, and at other end thereof with a holding mouth in communication with atmospheric air, said receiving compartment further provided in a wall thereof with an air inlet;

an elastic holding member disposed in the other end of said receiving compartment and provided with a large diametric hole and a small diametric hole extending from an inner end of said large diametric hole;

a press member movable disposed in said receiving compartment of said housing such that an inner end of said press member presses against said elastic holding member, said press member provided with a receiving hole extending along the direction of a longitudinal axis thereof, and at least one air hole extending from a periphery thereof to communicate with said receiving hole, said receiving hole provided in a wall thereof with a guide slope facing an outer end of said press member;

a first attraction member disposed in the proximity of an inner end of said press member;

a valve urging rod movable disposed in said receiving hole of said press member and provided with a second attraction member having the property of attracting said first attraction member, so as to enable said valve urging member to be located at said second attraction member when said valve urging rod is in a standby state;

a pushing member movable disposed in said receiving hole of said press member and provided with a receiving space whereby said receiving space is provided in the wall thereof with a plurality of slits, and pliable arms capable of bending along said guide slope at such time when said pushing member displaces in relation to said press member, thereby resulting in said valve urging member to be confined by said pliable arms;

a recovery member disposed in said receiving hole of said press member such that one end of said recovery member urges said press member, and that other end of said recovery member urges said press member; and a handle pivoted to said housing such that said handle presses against said pushing member, and that said handle can be swiveled between a standby position and an operation position, and further that said pushing member is forced to displace inward a distance at such time when said handle is swiveled from the standby position to the operation position whereby the distance is greater than a displaceable distance of said pushing member in relation to said press member.

2. The air pump nozzle as defined in claim 1, wherein said first attraction member is an annular plate held between said press member and said elastic holding member and is provided with a through hole corresponding to said small diametric hole of said holding.

3. The air pump nozzle as defined in claim 1, wherein said first attraction member is a magnet; wherein said second attraction member is made of a material capable of being attracted by said first attraction member.

4. The air pump nozzle as defined in claim 2, wherein said first attraction member is a magnet; wherein said second attraction member is made of a material capable of being attracted by said first attraction member.

5. The air pump nozzle as defined in claim 1, wherein said elastic holding member is formed of a soft large annular block, a rigid annular plate, and a soft small annular block, which are stacked together whereby said large annular block is greater in inner diameter and outer diameter than said small annular block; wherein said press member presses against said small annular block.

6. The air pump nozzle as defined in claim 1, wherein said receiving hole of said press member is provided in a wall of the proximity of an outer end thereof with an annular shoulder; wherein said pushing member is provided in a top thereof with an annular protruded edge capable of urging said annular shoulder.

7. The air pump nozzle as defined in claim 1, wherein said recovery member is a coil spring and is fitted over said pushing member.

* * * * *